Figure 1:
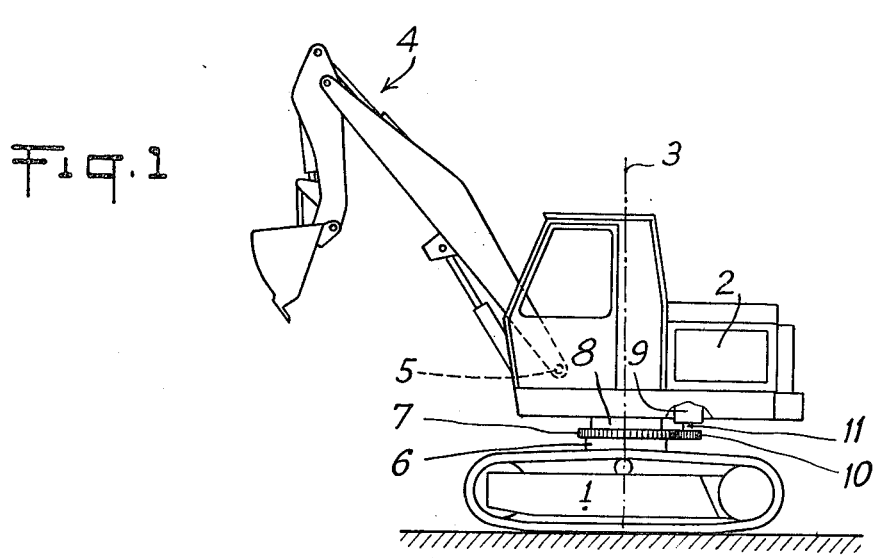

United States Patent [19]

Morizur

[11] 3,937,540
[45] Feb. 10, 1976

[54] DEVICE FOR GUIDING THE RELATIVE DISPLACEMENT OF TWO BODIES
[75] Inventor: Jean-Yves Morizur, Compiegne, France
[73] Assignee: Societe Anonyme: Poclain, Le Plessis-Belleville, France
[22] Filed: Feb. 18, 1975
[21] Appl. No.: 550,724

[30] Foreign Application Priority Data
Feb. 26, 1974  France .............................. 74.06509
[52] U.S. Cl. ................................................ 308/222
[51] Int. Cl.² ........................................ F16C 19/00
[58] Field of Search ............ 308/3 R, 3 A, 6 R, 205, 308/136, 137, 220, 222, 8, 36; 74/464, 465

[56] References Cited
UNITED STATES PATENTS
2,417,567  3/1947  Ray ..................................... 308/222
3,061,389  10/1962  Bargmann ........................... 308/221

Primary Examiner—M. H. Wood, Jr.
Assistant Examiner—Gene A. Church
Attorney, Agent, or Firm—Mason, Fenwick & Lawrence

[57] ABSTRACT

The present invention relates to the construction of a slide connecting two bodies.

A male member is fixed to the first body whilst a female member is fixed to the second body, whilst bolts for attaching the ring gear to the said first body are arranged to the right of the latter.

The invention is more particularly applicable to the construction of "roller rings" on a public works vehicle having a pivoting turret.

4 Claims, 4 Drawing Figures

1

DEVICE FOR GUIDING THE RELATIVE DISPLACEMENT OF TWO BODIES

Numerous devices exist for guiding the relative displacement of two members, comprising a slide placed between the said two members.

As an example it is pointed out that a roller ring placed between the chassis of a public works vehicle having a pivoting turret and the said turret has such a slide, whereby one element thereof is fixed to the turret and the other element is fixed to the chassis.

It has been noted, however, that the constructions according to the prior art have several disadvantages.

Thus, firstly one element of the slide is fixed to an adapter in offset manner relative to the core of the member corresponding to the said element, permitting the fitting of attaching bolts on the side of the said core.

Moreover the spacing of the attaching bolts fron the elements on their respective members must be limited, if not the resulting overhang may cause larger stresses in the slide, thereby compromising the satisfactory operation of the said slide.

After limiting the said spacing it is then noted that the bolt shafts are positioned in such a way relative to one of the members that it becomes impossible to use an automatic tightening tool because there is no space for the head of the said tool.

In short the existing arrangements result in often difficult and long assembly conditions, consequently they are also costly.

The invention serves to eliminate these disadvantages, which occur not only relative to the design of roller rings.

To this end it has for its object a device for the guidance of two bodies relative to one another, comprising a slide with a female member and a male member contained within the said female member, being supported on the latter, a row of elements for fixing one of the members to one of the bodies and another row of elements for fixing the other member to the other body, whereby those rows are substantially parallel and spaced by a given distance limited by the assembly regulations which must be observed in order to obtain a satisfactory guidance, whereby the fixing elements of at least one of the said rows each comprises a threaded rod and at least one nut cooperating with the said rod.

At the position of each of the said threaded rods a recess is made in the body corresponding to the said row of threaded rods issuing, in order to permit the introduction of the nut or nuts into the recess, into one face of the said body which is perpendicular to the fixing face of the member fixed to the said body, is delimited by a volume of material wherein is provided an orifice issuing into the fixing face and containing the nut or nuts, the said orifice permits the introduction of the end of the threaded rod into the recess but prevents the removal of the nut or nuts from the recess via the fixing face.

Advantageously rollers are positioned between the male and female members.

Finally according to a preferred application the two bodies comprise respectively the chassis and the turret pivoting on the said chassis of a public works vehicle, whilst one of the members is integral with a circular crown gear which orients the turrent relative to the chassis, whereby then the guidance device constitutes the roller ring of the vehicle.

The invention will be better understood and secondary characteristics and advantages thereof can be gathered more clearly from the following description of a roller ring according to the invention, with reference to the drawings, wherein show:

FIG. 1 an elevation of a hydraulic shovel equipped with a roller ring according to the invention.

Figure 2:
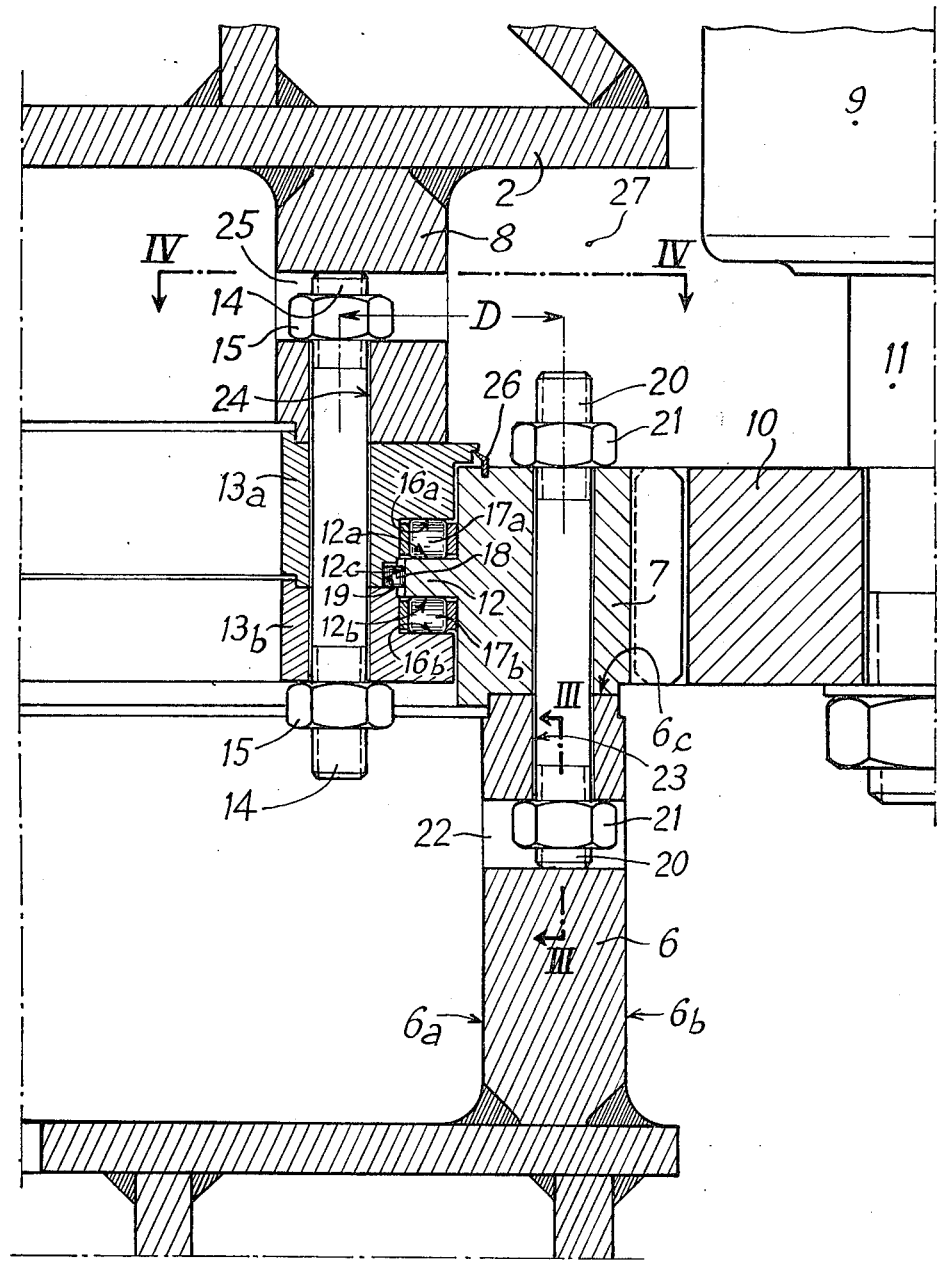

FIG. 2 a radial section of the roller ring of the shovel of FIG. 1.

Figure 3:
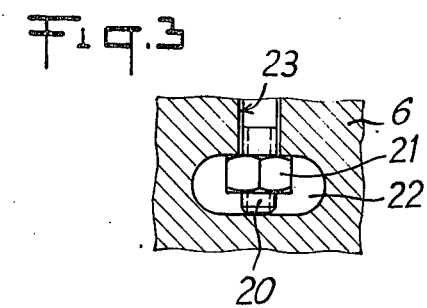
Figure 4:
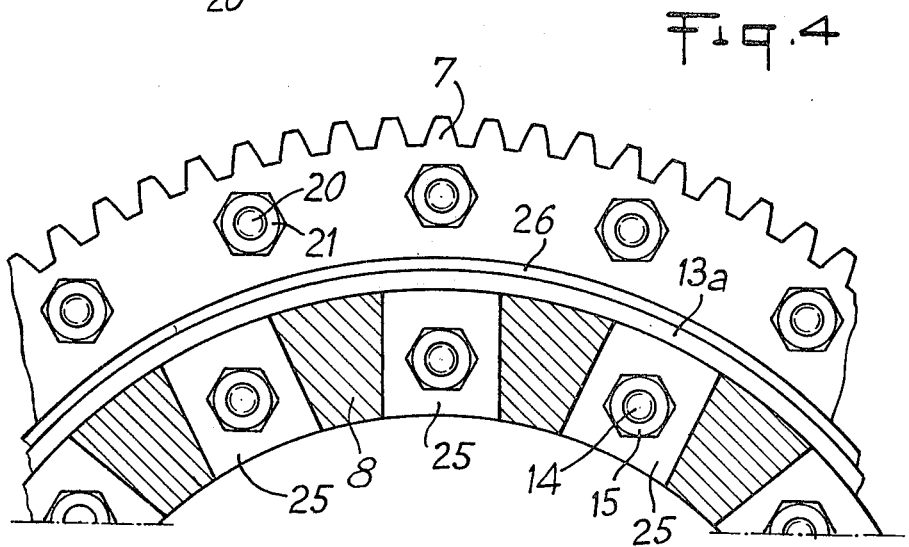

FIGS. 3 and 4 sections along the lines III—III and IV—IV respectively of FIG. 2.

The hydraulic shovel according to FIG. 1 comprises a caterpillar chassis 1, a turret 2 which pivots on chassis 1 about a vertical axis 3 and a working gear 4 of the type constituted by a jib, a beam and a bucket and which is articulated on turret 2 about horizontal axis 5.

A cylindrical jib post 6 integral with chassis 1 is directed upwardly and is provided in its upper portion with a crown gear 7 which is integral therewith. Another cylindrical jib post 8 is integral with turret 2 and oriented downwardly and rotates precisely on post 6, so as to effect the fixing of turret 2 on chassis 1. In known manner the member 9 of a hydraulic engine for regulating the orientation of turret 2 relative to the chassis is fixed to the said turret, whilst a pinion 10 is fixed to the output shaft 11 of the engine and meshes with crown gear 7.

FIG. 2 shows the mounting in rotary manner of post 8 on post 6. This is effected by means of a slide comprising a male member 12 forming an integral part of the vertical inner face of crown gear 7 and two annular rings 13a, 13b which are assembled by bolts with threaded rods 14 and nuts 15 with jib rod 8 and whereby each is provided with a circular slot 16a, 16b wherein is introduced the male member 12. The rollers 17a of a first group are placed between the upper face 12a of member 12 and the horizontal face of slot 16a, whilst the rollers 17b of a second group are placed between the lower face 12b of member 12 and the horizontal face of slot 16b. Rollers 17a, 17b have horizontal shafts. Moreover small rollers 18 are placed between the vertical face 12c of member and a vertical face 19 delimiting a housing provided in ring 13a, whereby rollers 18 have vertical shafts and ensure a satisfactory centering of rings 13a, 13b relative to member 12 or, in other words, post 8 of turret 2 relative to crown gear 7.

Crown gear 7 is fixed to post 6 by means of a row of bolts arranged parallel to the row of rods 14. These bolts in fact comprise threaded rods 20 and a nut 21 arranged at either end of a rod. It should be noted that the rods 20 are located to the right of jib post 6, recesses being made by milling at places in the said post and issuing by vertical lateral faces 6a, 6b of this post, permitting the introduction of a nut 21. Furthermore each recess communicates with the horizontal face 6c for fixing crown gear 7 on jib post 6 by an orifice 23 permitting the passage of the corresponding rod 20 whilst maintaining nut 21 in the recess.

The same arrangement is adopted for rods 14 and nuts 15 fixed to one of their ends, whereby the rods 14 are positioned to the right of jib post 8 and pass through orifices 24 communicating with recesses 25, wherein are provided nuts 15. Finally a lipped joint 26 is provided between crown gear 7 and annular ring 13a.

The proposed arrangement is advantageous in several respects. It firstly makes it possible to position the rods 14 and 20 to the right of jib posts 8 and 6, whereby the said posts mechanically stressed under optimum conditions for the strength of the materials.

Moreover this arrangement makes it possible to obtain a free space 27 above nuts 21 external of post 6, which is not always possible in the prior art arrangements where the row of rods 14 is positioned alongside post 8, which is located between rods 14 and rods 20. As the distance D between rods 14 and 20 must always be below a given value in order to ensure satisfactory operating conditions for rollers 17a, 17b, post 8 was located in space 27, (according to the prior art) space 27 being particularly small. The freeing of this space as a result of the invention makes it possible to use an automatic tightening tool for bolts 21. This is important because as a result on a high power shovel it is possible to reduce the roller ring assembly time, from the previous 2 days to one-half a day.

Finally the positioning of rods 14 and 20 to the right of their respective jib post makes it unnecessary to secure to the said posts additional members forming knee brackets for fixing the rods. Thus, the proposed arrangement leads to saving in material and in weight of the complete turret rotation control assembly, comprising the roller ring in its fixing configuration to the vehicle provided therewith.

The adoption of screw — nut assemblies also makes it particularly easy to replace worn or broken parts. Moreover, the invention can obviously also be applied on the one hand to slides not equipped with rollers and on the other to randomly shaped slides, i.e. not circular.

The invention is not limited to the embodiments described and represented but can instead cover all variants thereof coming within the scope of the invention, thus for example the recesses 22 and 25 can be produced by moulding.

What is claimed is:

1. A device for the guidance of two bodies relative to one another, comprising a slide with a female member and a male member contained within the said female member, being supported on the latter, a row of elements for fixing one of the members to one of the bodies and another row of elements for fixing the other member to the other body, whereby those rows are substantially parallel and spaced by a given distance limited by the assembly regulations which must be observed in order to obtain a satisfactory guidance, whereby the fixing elements of at least one of the said rows each comprises a threaded rod and at least one nut cooperating with the said rod, wherein at the position of each of the said threaded rods a recess is made in the body corresponding to the said row of threaded rods issuing, in order to permit the introduction of the nut or nuts into the recess, into one face of the said body which is perpendicular to the fixing face of the member fixed to the said body, is delimited by a volume of material wherein is provided an orifice issuing into the fixing face and containing the nut or nuts, the said orifice permits the introduction of the end of the threaded rod into the recess but prevents the removal of the nut or nuts from the recess via the fixing face.

2. A device according to claim 1, wherein the rollers are positioned between the male and female members.

3. A device according to claim 1, wherein the two bodies comprise respectively the chassis and the turret pivoting on the said chassis of a public works vehicle, whilst one of the members is integral with a circular crown gear which orients the turret relative to the chassis, whereby then the guidance device constitutes the roller ring of the vehicle.

4. A device according to claim 2, wherein the two bodies comprise respectively the chassis and the turret pivoting on the said chassis of a public works vehicle, whilst one of the members is integral with a circular crown gear which orients the turret relative to the chassis, whereby then the guidance device constitutes the roller ring of the vehicle.

* * * * *